US008825238B2

(12) United States Patent
Peptione et al.

(10) Patent No.: US 8,825,238 B2
(45) Date of Patent: Sep. 2, 2014

(54) AIRCRAFT SYSTEMS AND METHODS FOR MONITORING ENERGY HEIGHT

(75) Inventors: Dave Peptione, Sun City West, AZ (US); Blake Wilson, Peoria, AZ (US); Roger W. Burgin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1719 days.

(21) Appl. No.: 12/177,671

(22) Filed: Jul. 22, 2008

(65) Prior Publication Data
US 2010/0036552 A1 Feb. 11, 2010

(51) Int. Cl.
*G06F 7/00* (2006.01)
(52) U.S. Cl.
USPC ............. 701/16; 701/9; 340/963; 340/972
(58) Field of Classification Search
USPC ............................... 701/16; 340/963
See application file for complete search history.

(56) References Cited

U.S. PATENT DOCUMENTS

| 4,319,219 | A | * | 3/1982 | Rein-Weston | 340/968 |
| 6,978,205 | B2 | * | 12/2005 | Ryan et al. | 701/120 |
| 7,068,187 | B2 | * | 6/2006 | Ishihara et al. | 340/951 |
| 7,853,370 | B2 | * | 12/2010 | Coulmeau et al. | 701/16 |
| 8,014,912 | B2 | * | 9/2011 | Zadrozynski et al. | 701/16 |
| 8,165,735 | B2 | * | 4/2012 | Constans | 701/15 |
| 8,170,727 | B2 | * | 5/2012 | Deker | 701/3 |
| 2001/0052562 | A1 | * | 12/2001 | Ishihara et al. | 244/175 |
| 2004/0044446 | A1 | * | 3/2004 | Staggs | 701/16 |
| 2004/0075586 | A1 | * | 4/2004 | Glover | 340/963 |
| 2004/0167685 | A1 | * | 8/2004 | Ryan et al. | 701/16 |
| 2006/0200279 | A1 | * | 9/2006 | Ainsworth et al. | 701/16 |
| 2008/0012729 | A1 | * | 1/2008 | Constans | 340/973 |
| 2009/0048724 | A1 | | 2/2009 | Caule | |

FOREIGN PATENT DOCUMENTS

WO 2007093698 A1 8/2007

OTHER PUBLICATIONS

The transmittal letter for the PGPUB US2009/0048724 indicating the specification is an english translation of the PCT/FR2007/000247 reference.*
EP Search Report dated Oct. 22, 2009, EP 09164838.6-2206.

* cited by examiner

*Primary Examiner* — Thomas Black
*Assistant Examiner* — Peter D Nolan
(74) *Attorney, Agent, or Firm* — Ingrassia Fisher & Lorenz, P.C.

(57) ABSTRACT

A system is provided for monitoring an energy height of an aircraft during landing. The system includes a database including landing distance data; a processing unit configured to receive the landing distance data from the database and to calculate a landing distance of the aircraft based on a velocity and a height of the aircraft, the processing unit further configured to provide display signals based on the landing distance; and a visual display coupled to the processing unit and configured to provide a visual image based on the display signals.

16 Claims, 6 Drawing Sheets

AIRCRAFT SYSTEMS AND METHODS FOR MONITORING ENERGY HEIGHT

TECHNICAL FIELD

The present invention generally relates to aircraft systems and method, and more particularly, to aircraft systems and methods for monitoring the energy height during landing situations.

BACKGROUND

Landing is one of the most demanding tasks in flying. During the landing process, the aircraft generally must be brought to a safe and complete stop within a given runway distance. Conventional systems may provide estimates of the amount of runway necessary to safely land the aircraft. These estimates are based on certified, known landing distance data. The known landing distance data, however, is based on the aircraft having a particular energy, which includes the speed (i.e., the kinetic energy) and the height (i.e., the potential energy) of the aircraft. In other words, the landing distance data is predicated on crossing the threshold of the runway at a specified height and a specified speed. If the pilot crosses the runway threshold at the improper height or speed, the necessary runway distance may vary from this estimate. For example, if the aircraft is traveling too fast or too high, the aircraft will need additional runway length, or the aircraft must expend energy from the engine to slow down the aircraft. In addition to speed and height, additional factors are commonly considered by the pilot when evaluating the landing. These factors can include contaminated runway conditions, wind conditions, and availability of certain types of equipment. Unless the aircraft crosses the threshold of the runway at the specified height and speed and none of these additional factors are present, the pilot is generally required to estimate the actual aircraft energy, and the amount of landing distance required, and to compare these distances to evaluate the safety of the landing.

If the pilot does not accurately estimate the energy of the aircraft and the remaining length of the runway, the aircraft could potentially overrun the end of the runway. Pilots are trained to monitor these conditions during the approach, and to initiate a go-around maneuver if a safe landing is not assured. In any of these situations, however, the effectiveness of pilot training depends on the skill and judgment of the pilot in recognizing a possible runway overrun condition, and in executing the appropriate response. Pilots with varying levels of skill are therefore likely to respond differently to the same scenario.

Additionally, in most landing and departure situations, the pilot's vision is the sole data source for estimating runway position information. Even with existing high standards for pilot eyesight, some variation in acuity will occur as the pilot's physical condition, alertness, and state of rest vary. If the pilot's vision is the sole source of data used to determine whether a go-around or aborted takeoff is appropriate, then variations in visual acuity, distractions or poor visibility may reduce the quality of the data used in the pilot's decision. In addition, a pilot may fly for years without experiencing a runway overrun, and the pilot may be slow to recognize a problem during landing.

Accordingly, it is desirable to provide systems and methods that monitor the energy state of the aircraft during a landing condition and provide the pilot with a warning if an overrun situation may occur. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system is provided for monitoring an energy height of an aircraft during landing. The system includes a database including landing distance data; a processing unit configured to receive the landing distance data from the database and to calculate a landing distance of the aircraft based on a velocity and a height of the aircraft, the processing unit further configured to provide display signals based on the landing distance; and a visual display coupled to the processing unit and configured to provide a visual image based on the display signals.

In accordance with another exemplary embodiment, a method of calculating a landing distance of an aircraft on a runway includes determining a velocity and a height of the aircraft; calculating an energy height based on the velocity and the height; calculating the landing distance of the aircraft based on the energy height; and issuing a warning if the landing distance extends into a safety margin of the runway or exceeds a runway length.

In accordance with another exemplary embodiment, a system for monitoring an energy height of an aircraft during landing includes a database including landing distance data; a processing unit configured to receive the landing distance data from the database and to calculate a landing distance of the aircraft based on a velocity and a height of the aircraft; and a visual display coupled to the processing unit. The processing unit is configured to calculate an energy height of the aircraft based on the speed and height and to provide display signals representing the energy height for display on the visual display. The visual display displays an energy height monitor based on the energy height. The energy height monitor includes an energy portion and an outline portion. The energy height monitor indicates at least one of a safe situation, an advisory situation, and an alert situation, the safe situation indicating that the aircraft will land safely within a length of the runway, the advisory situation indicating that the aircraft will land within a margin portion of the runway, and the alert situation indicating that the aircraft will overrun the runway.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide systems and methods for monitoring the energy height of an aircraft. More specifically, the systems and methods evaluate the energy height of the aircraft, display an energy height monitor, and display a warning when a runway overrun may occur during landing.

Figure 1:
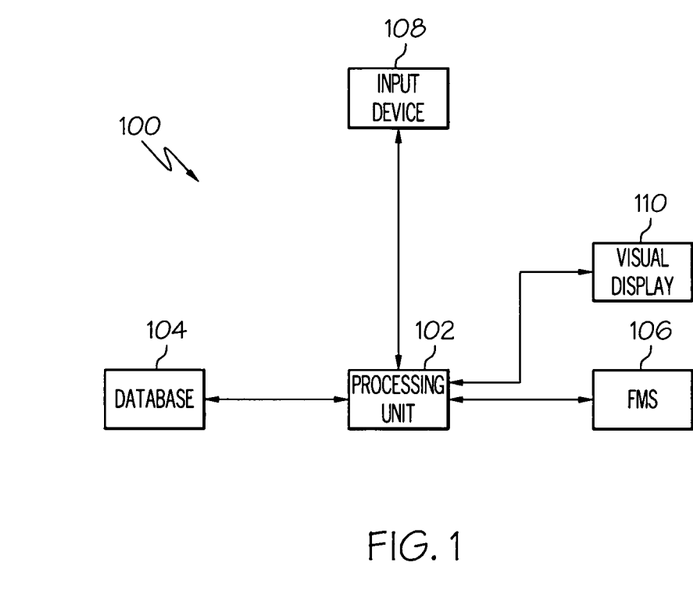
FIG. 1 is a functional block diagram of a system for monitoring the energy height of an aircraft according to an exemplary embodiment.

FIG. 1 depicts a block diagram of an exemplary aircraft system 100 for monitoring, evaluating, and displaying the energy height of an aircraft during landing. The system 100 includes a processing unit 102, a database 104, a flight management system 106, an input device 108, and a visual display 110. Notably, it should be understood that although the system 100 appears in FIG. 1 to be arranged as an integrated system, the system 100 is not so limited and can also include an arrangement whereby one or more of the processing unit 102, database 104, the flight management system 106, the input device 108, and the visual display 110 is a separate component or a subcomponent of another system located either onboard or external to an aircraft. Also, for example, the system 100 can be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, fixed wing and rotor aircraft, such as helicopters, as well as other types of vehicles. For simplicity, embodiments are described below with reference to "aircraft."

The processing unit 102 can be a computer processor associated with a primary flight display (PFD). Generally, the processing unit 102 receives and/or retrieves flight management information (e.g., from the flight management system 106), landing information (e.g., from database 104), and pilot input (e.g., from input device 108); processes the information and inputs; and generates display control signals for a visual display (e.g., the visual display 110). More specific functions of the processing unit 102 will be discussed below.

Database 104 is coupled to processing unit 102 and can be a memory device (e.g., non-volatile memory, disk, drive, tape, optical storage device, mass storage device, etc.) that can store digital landing information. Database 104 can also include, for example, a terrain database, which includes the locations and elevations of natural terrain and man-made obstacles. Database 104 includes aircraft data and runway and/or taxiway data as discussed below.

The runway and/or taxiway data may be obtained from airports, Runway Awareness and Advisory System (RAAS), and airport mapping database (AMDB). The runway data may include, for example, the length, altitude and gradient of the intended landing runway. The runway data may also include a map of the airport, which includes data defining the runways at the airport, including the runway identifications. The runway data can be used to compare aircraft position with the distance to any of the runway boundaries, including the aircraft's height above ground in relation to a runway environment.

The aircraft data may be obtained from the Federal Aviation Administration (FAA) and aircraft manufacturers, such as from aircraft flight manual. Generally, the aircraft data includes certified landing distance data, including required landing distances, which are discussed in greater detail below. The aircraft data may also include aircraft characteristics as a function of, for example, aircraft weight, with corrections based on, for example, wind direction, runway slope, runway surface condition, atmospheric altitude and outside temperature. The aircraft data may also include a list of manufacturer or company regulations defining various aspects of flight. For example, a company regulation may define maximum permissible airspeeds, groundspeeds, descent angles, minimum runway, required gear and flap configurations, etc., for different stages of landing.

The flight management system 106 is coupled to processing unit 102, and can provide navigation data associated with the aircraft's current position and flight direction to the processing unit 102. The navigation data provided to the processing unit 102 can include information such as the aircraft's airspeed, ground speed, track, temperature, acceleration, heading, wind vectors, altitude, pitch, and other important flight information. Information can be provided to the processing unit 102 by, for example, an Inertial Reference System (IRS), Air-data Heading Reference System (AHRS), and/or a global positioning system (GPS). Additionally, navigation and other types of data can be provided from other sources outside of the flight management system 106, including sensor information, OAT, and pressure data.

The visual display 110 may include any device or apparatus suitable for displaying various types of computer generated symbols and information in an integrated, multi-color or monochrome form based on display control signals from the processing unit 102. In this embodiment, the visual display 110 is an aircraft cockpit, multi-color display (e.g., a Primary Flight Display). Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
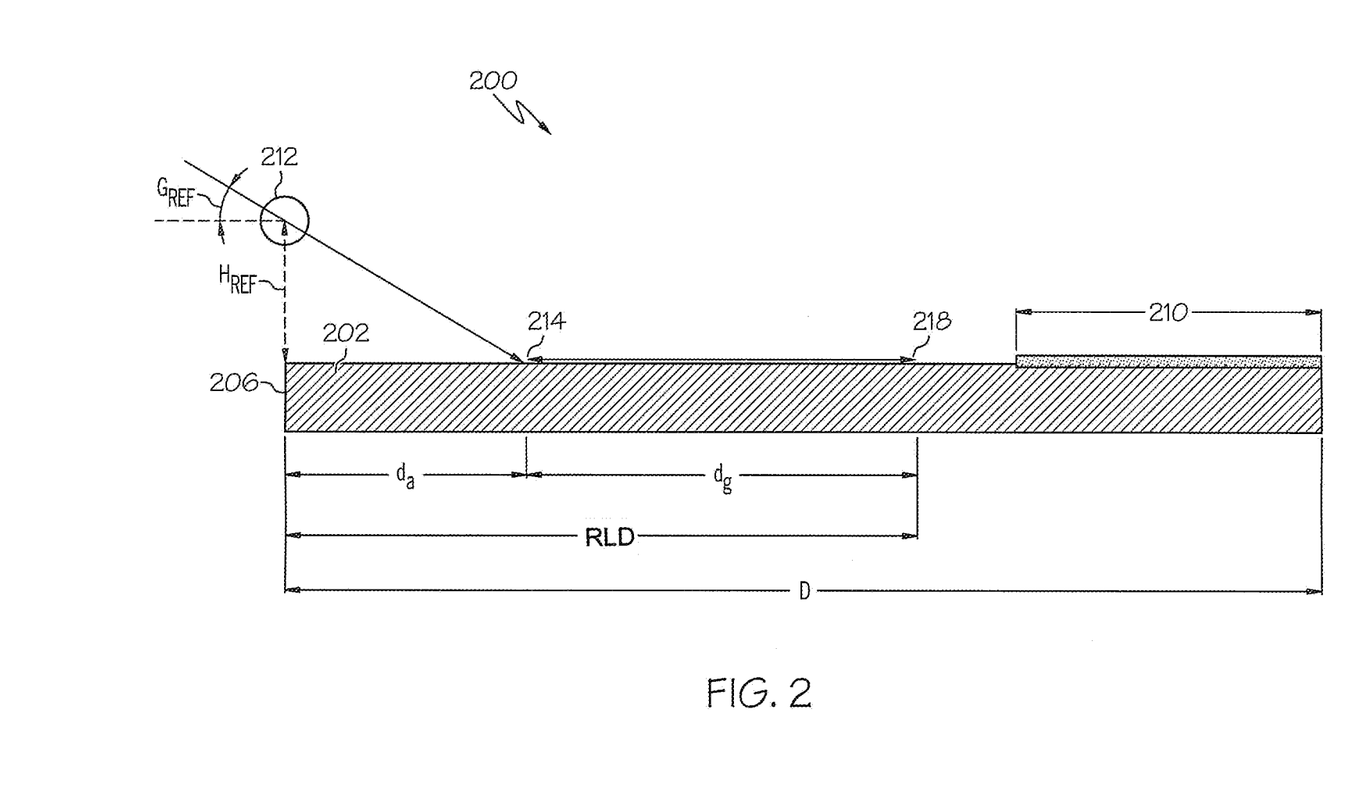
FIG. 2 is an elevation view of exemplary runway environment used to describe the system of FIG. 1.
Figure 3:
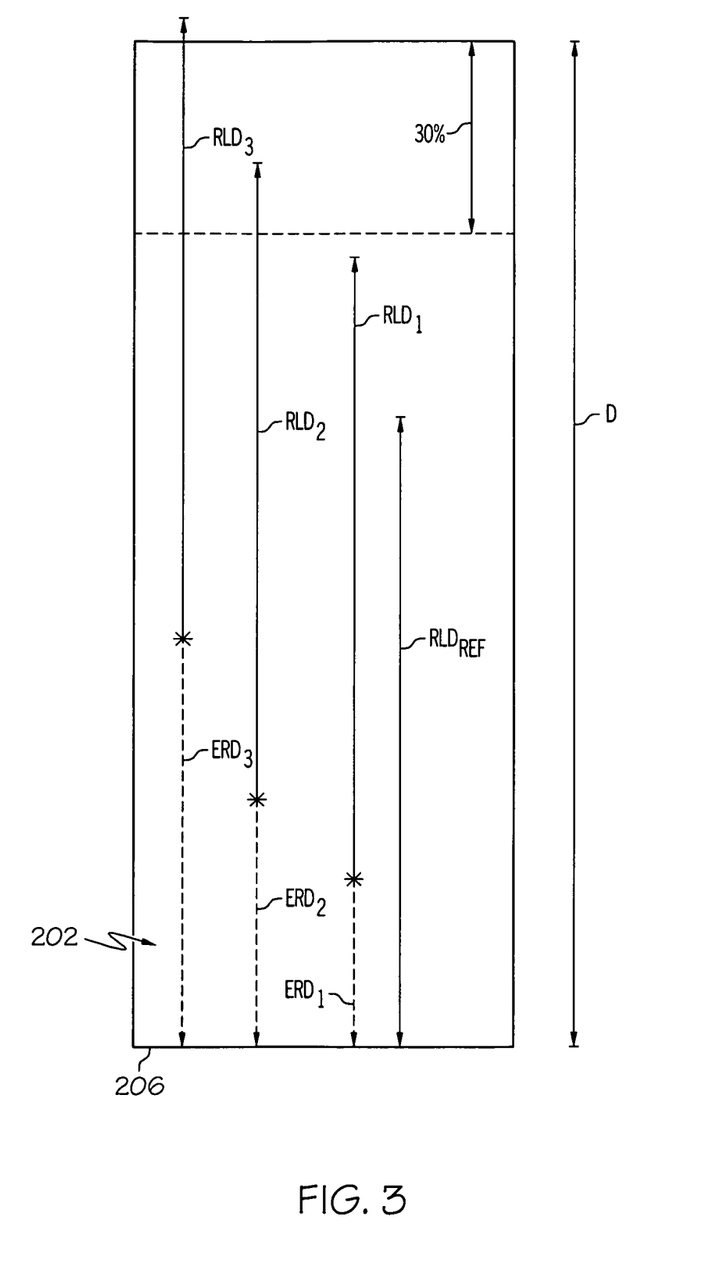
FIG. 3 is a plan view of the exemplary runway environment of FIG. 2.

FIGS. 2 and 3 are diagrams of an exemplary runway environment 200 used to describe the system 100 of FIG. 1. FIG. 2 is an elevation view, and FIG. 3 is a plan view. The runway environment 200 includes a runway 202 with a total runway length (D) that begins at a threshold 206. A portion of the runway 202, typically 30% of the total runway length (D), is designated a safety margin 210.

FIG. 2 particularly shows an optimal landing condition in which an aircraft 212 crosses the threshold 206 at a specified height ($H_{REF}$), velocity ($V_{REF}$), and glide angle ($G_{REF}$). In one embodiment, the desired, specified height ($H_{REF}$) is 50 feet and the specified velocity ($V_{REF}$) can be 1.3 times the stall speed of the aircraft 212, depending on conditions. The specified glide angle ($G_{REF}$) can be, for example in one embodiment, about 3°, although other embodiments may use greater or lesser angles. Based on these values, the system 100 will predict a value for the required landing distance ($RLD_{EF}$) that will be necessary to safely land the aircraft 212. The required landing distance ($RLD_{EF}$) generally includes of an air distance ($d_a$) that extends from the threshold 206 to a touchdown point 214 and a groundroll distance ($d_g$) that extends from the touchdown point 214 and a stopping point 218. The predicted required landing distance ($RLD_{REF}$) values can be based on certified on-board AFM produced landing distance data, which are generally well known in the aeronautical industry. However, as noted above, the predicted required landing distance ($RLD_{REF}$) values are predicated on the aircraft 212 crossing the threshold 206 at the required height ($H_{REF}$), velocity ($V_{REF}$), and glide angle ($G_{REF}$). In conventional systems, any deviation from this desired reference state can lead to an error in the predicted landing distance.

As noted above, exemplary embodiments of the system 100 monitor the energy height of an aircraft and provides accurate predicted landing distance indications in all situations, including situations that deviate from the desired reference state. The display of the energy height monitor and overrun alerts are discussed in greater detail below with reference to FIGS. 4-6, and the calculations and algorithms used to generate the monitor and alerts will now be discussed by referring again to FIGS. 2 and 3.

The energy height of the aircraft at the threshold 206 is first calculated. Energy height represents the sum instantaneous potential and kinetic energies of the aircraft, represented by height and speed, respectively. The energy height may be most easily visualized as the altitude the aircraft would attain if its kinetic energy were completely converted into potential energy.

In one embodiment, the current energy height (CEH) at the threshold 206 is calculated with the altitude (A) of the aircraft, the touchdown elevation (TE) of the runway 202, the calibrated airspeed of the aircraft (CAS), and the desired specified velocity ($V_{REF}$). One possible relationship is shown in Equation (1), although other techniques for calculating energy height and subsequent approaches for evaluating the appropriate landing situation can be provided.

$$CEH = A - TE + \frac{CAS^2 - V_{REF}^2}{2g} \quad (1)$$

Essentially, Equation (1) uses the physics of energy conservation to convert a velocity differential to a height parameter, which is added to height differential to render the current energy height (CEH).

The corresponding desired energy height (DEH) is then calculated based upon the desired approach glide angle ($G_{REF}$), the length (D) of the runway, the desired specified height ($H_{REF}$), the touchdown elevation (TE), and/or other factors as appropriate. One possible relationship is shown in Equation (2).

$$DEH=TE+\sin(G_{REF})*D+H_{REF} \quad (2)$$

The ratio of current energy height (CEH) to desired energy height (DEH) indicates how precisely the aircraft is performing to the desired energy profile. A value of one indicates the aircraft has the desired energy, while a value greater than one indicates the aircraft has too much energy and a value less than one indicates the energy state is low.

The current energy height (CEH), desired energy height (DEH), and the actual glide angle (G) can be used to calculate how much extra runway distance (ERD) will be required as a result of the current energy state. One possible relationship is shown in Equation (3).

$$ERD=(CEH-DEH)\times\sin(G) \quad (3)$$

The extra runway distance (ERD) corresponds to the distance from the threshold 206 to the location on the runway 202 where the aircraft will have the proper energy height. At the proper energy height, known landing distance data, as discussed above, can be used to determine the required landing distance (RLD) from that point. The sum of the extra runway distance (ERD) and the required landing distance (RLD) can simply be referred to as the "landing distance" since it represents the distance from the threshold 206 to the stopping point 218 after landing.

In some situations, the required landing distance (RLD) can be adjusted by "additives" based on input from the flight crew (e.g., from the input device 108). Additives can includes factors such as wind, braking reports, and runway conditions. The system 100 can pull data from database 104 to adjust the required landing distance (RLD). The additives can comply, for example, with the additive guidance heuristics provided by AC 90-94 circular.

Once the proper required landing distance (RLD) is determined, the required landing distance (RLD) and the extra runway used (ERD) can then be is compared to the total length of the runway (D) to determine whether or not any remaining runway (RR) distance is available to accommodate the aircraft. One possible relationship is shown in Equation (4).

$$RR=D-ERD-RLD \quad (4)$$

Some examples of possible landing conditions in an exemplary embodiment that may result from Equation (4) are shown in FIG. 3. In a first condition, the remaining runway (RR) can yield a value that is positive and greater than 30% of the runway length. As such, in this condition, the extra runway distance (ERD1) and the required landing distance (RLD1) fall well within (i.e., within 70%) of the total length of the runway (D). This situation is a "safe" landing condition, and no warning is necessary. In a second condition, the remaining runway (RR) can yield a value that is positive but less than 30% of the runway length (D). As such, in this condition, the extra runway distance (ERD2) and the required landing distance (RLD2) fall within of the total length of the runway (D), but the aircraft will stop within the safety margin of the length of the runway (D). This situation is an "advisory" landing condition, and an advisory warning can be issued. In a third condition, the remaining runway (RR) can yield a value that is negative. As such, in this condition, the extra runway distance (ERD3) and the required landing distance (RLD3) exceed the total length of the runway (D), and an overrun situation is possible. This situation is an "alert" landing condition, and an alert warning can be issued.

Figure 4:
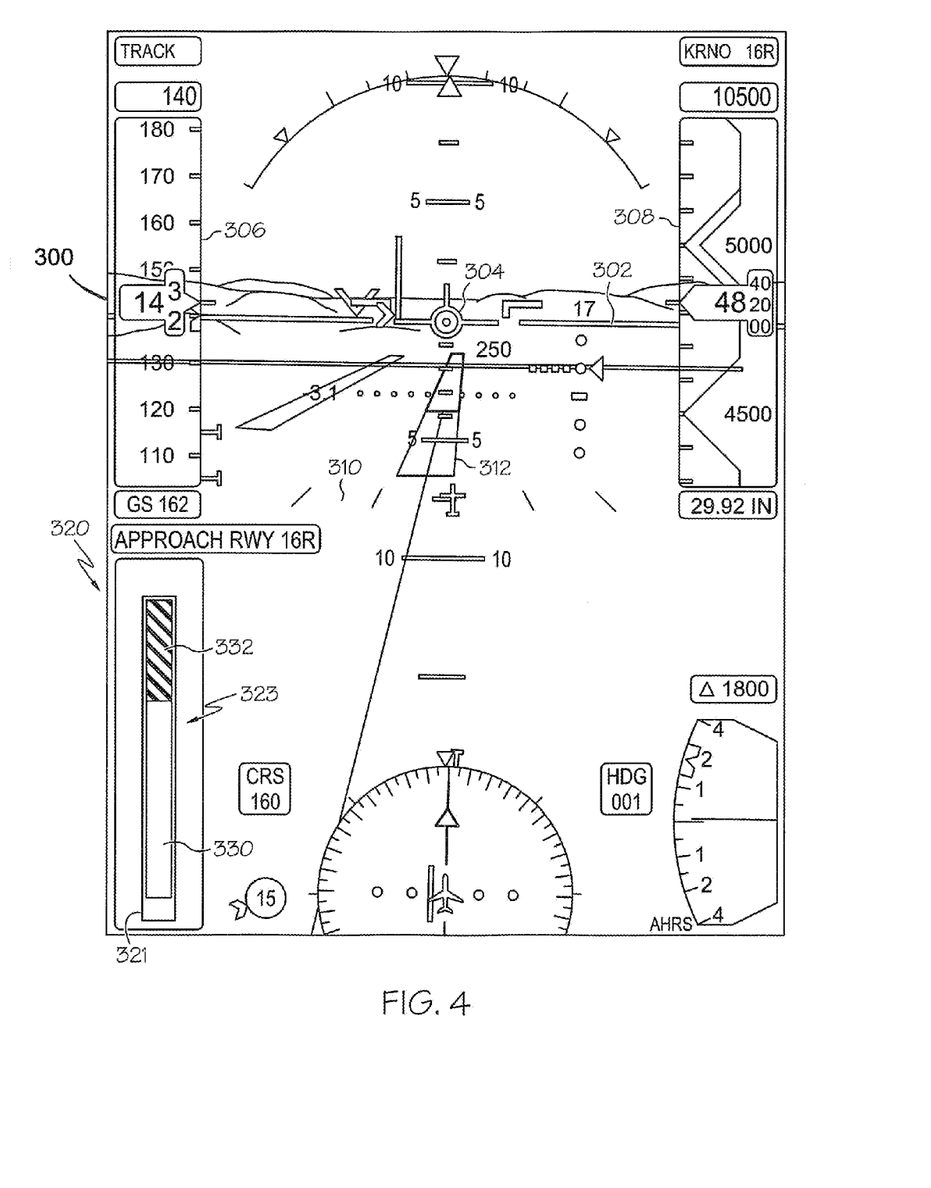
FIG. 4 depicts an exemplary image that may be rendered by the system of FIG. 1 in a first landing situation.
Figure 5:
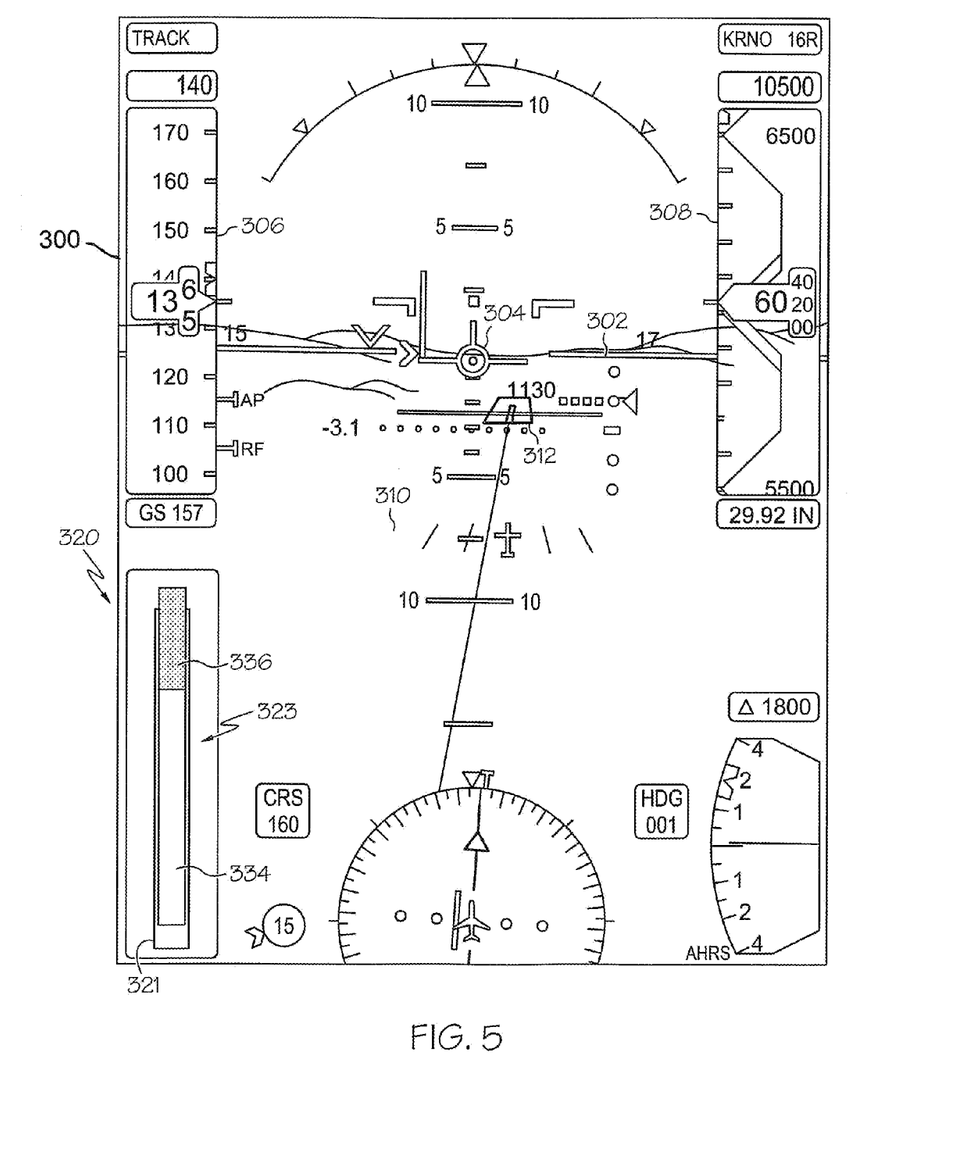
FIG. 5 depicts an exemplary image that may be rendered by the system of FIG. 1 in a second landing situation.
Figure 6:
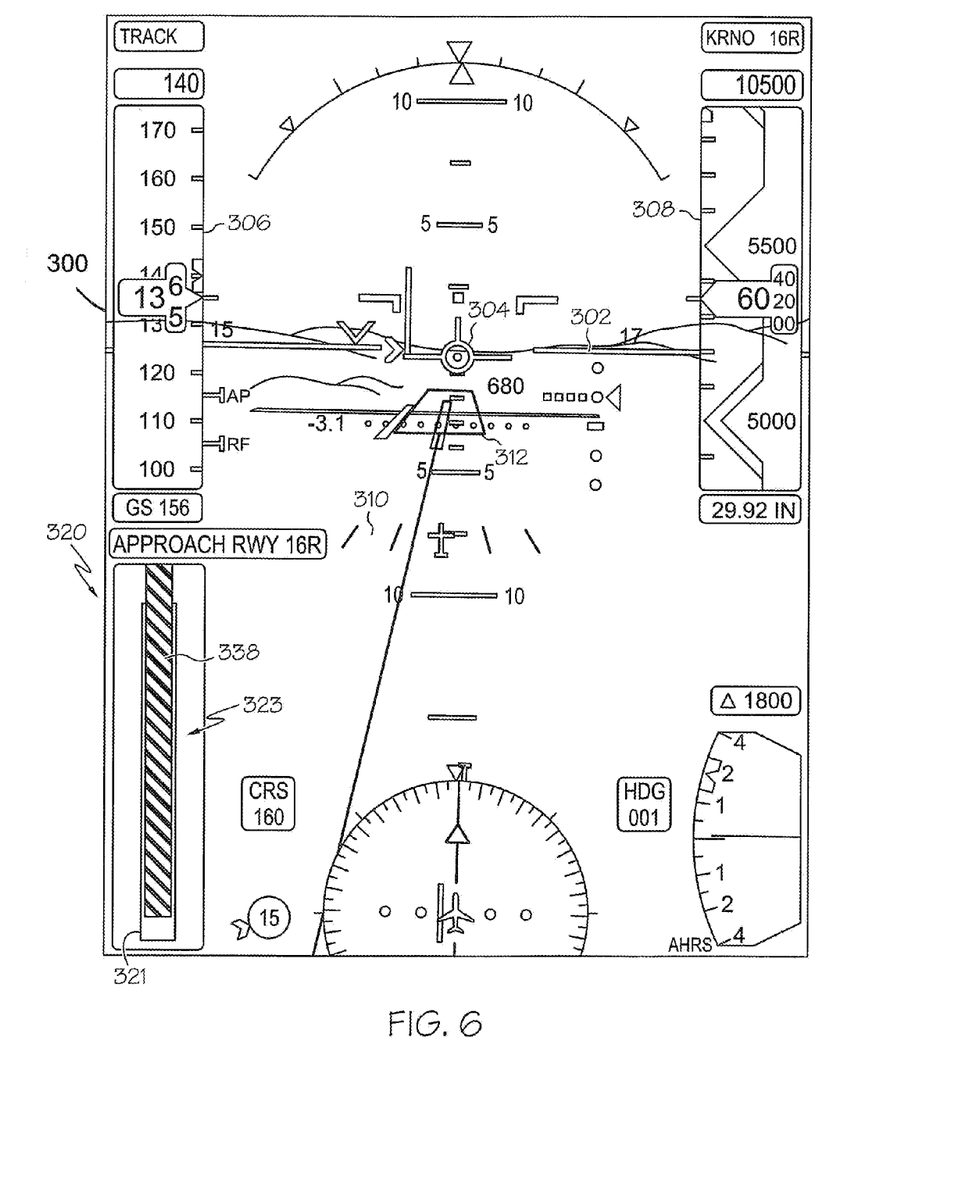
FIG. 6 depicts an exemplary image that may be rendered by the system of FIG. 1 in a third landing situation.

FIGS. 4-6 depict examples of an exemplary visual display 300 that may be rendered by the aircraft display system 100 of FIG. 1 in the various landing conditions discussed above in reference to FIGS. 2 and 3. The display 300 in each of FIGS. 4-6 shows, among other things, computer generated symbols representing a zero pitch reference line (e.g., commonly referred to as a horizon line) 302, a flight path marker (also known as a flight path vector or velocity vector) 304, an airspeed scale or tape 306, an altitude scale or tape 308, and terrain (e.g., identified generally as element 310). In this embodiment, the terrain 310 is rendered as a three-dimensional, perspective view. The terrain 310 includes a representation of an approaching airport runway 312. Although the display 300 is shown as an egocentric, first-person frame of reference, the display 300 can be a secondary, wingman, and/or plan or perspective view that enables a viewer to view the aircraft, as well as zoom in and out.

The display 300 further includes a graphical representation of an energy height monitor 320. The energy height monitor 320 generally has an outline portion 321 that represents the length of the runway and an energy portion that indicates the relative energy height of the aircraft and varies depending on the situation. FIG. 4 particularly shows the energy height monitor 320 during the first landing situation in which the aircraft can safely land well within the length of the runway. Since no warning is necessary, the energy portion 323 of the energy height monitor 320 can be a "safe" color such as green, and includes a solid segment 330 and a striped segment 332 within the outline portion 321 that indicates that the length of the runway can accommodate the landing distance required and the safety margin.

FIG. 5 particularly shows the energy height monitor 320 during the second landing situation in which the aircraft can safely land within the length of the runway but must use some of the safety margin. An "advisory" warning is indicated by providing energy portion 323 with a green solid segment 334 and an amber solid segment 336. The amber solid segment 336 can represent the safety margin and extend past the end of the outline portion 321 of the energy height monitor 320 to indicate that the safety margin cannot be accommodated. The advisory warning of the energy height monitor 320 can be accompanied by an auditory warning. If the pilot is uncomfortable in the advisory situation, the pilot can expend engine power to slow down the aircraft, adjust the aircraft approach, and/or pull up and re-approach the runway.

FIG. 6 particularly shows the energy height monitor 320 during the third landing situation in which the required landing distance of the aircraft may exceed the length of the runway. An "alert" warning is indicated by providing the energy portion with a striped, red segment 338 that extends past the end of the outline portion 321 of the energy height monitor 320. The alert warning of the energy height monitor 320 can be accompanied by an auditory warning. As such, FIGS. 4-6 provide a compelling display of an energy height monitor 320 that indicates whether or not the aircraft will overrun the runway based on the monitored energy height. This display will be available to the pilot in enough time for the pilot to recognize and react. If the energy height monitor 320 indicates that an overrun is possible, the pilot can take measures to prevent.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for monitoring an energy height of an aircraft during landing, comprising:
    a database including landing distance data;
    a processing unit configured to receive the landing distance data from the database and to calculate a landing distance of the aircraft based on a velocity and a height of the aircraft, the processing unit further configured to provide display signals based on the landing distance; and
    a visual display coupled to the processing unit and configured to provide a visual image based on the display signals,
    wherein the processing unit is configured to calculate the landing distance based on an energy height of the aircraft, and
    wherein the visual display displays an energy height monitor based on the energy height, the energy height monitor including an energy portion and an outline portion,
    wherein the energy height monitor selectively indicates a safe situation, an advisory situation, and an alert situation,
    wherein the safe situation indicates that the aircraft will land safely within a length of the runway, the advisory situation indicates that the aircraft will land within a safety margin portion of the runway, and the alert situation indicates that the aircraft will overrun the runway,
    wherein the outline portion represents a runway and the energy portion represents the energy height of the aircraft, the energy portion being superimposed on the outline portion to depict the energy height relative to the runway,
    wherein the energy portion displayed on the visual display during the safe situation and the advisory situation includes a landing portion and a safety portion.

2. The system of claim 1, wherein the processing unit produces a warning if the landing distance exceeds the runway length.

3. The system of claim 1, wherein the processing unit produces a warning if the landing distance exceeds at least 70% of the runway length.

4. The system of claim 1, wherein the processor is configured to adjust the landing distance based on additives.

5. The system of claim 4, wherein the additives includes at least one of wind conditions and runway conditions.

6. The system of claim 1, wherein the processor is configured to calculate the landing distance based on an energy height of the aircraft at a threshold of the runway.

7. The system of claim 1, wherein the safety portion extends out of the outline portion during the advisory situation.

8. The system of claim 1, wherein the energy portion extends out of the outline portion during the alert situation.

9. A method of calculating a landing distance of an aircraft on a runway, comprising:
    determining a velocity and a height of the aircraft with an aircraft system;
    calculating an energy height with the aircraft system based on the velocity and the height;
    calculating the landing distance with the aircraft system of the aircraft based on the energy height;
    issuing a warning with the aircraft system if the landing distance extends into a safety margin of the runway or exceeds a runway length;
    displaying the warning on a visual display by displaying an energy height monitor with an energy portion that extends out of an outline portion;
    displaying the outline portion representing the runway and the energy portion representing the energy height of the aircraft, the energy portion being superimposed on the outline portion to depict the energy height relative to the runway; and
    displaying the energy portion on the visual display during a safe situation and an advisory situation with a landing portion and a safety portion.

10. The method of claim 9, wherein the determining step include determining the velocity and the height at a threshold of the runway.

11. The method of claim 10, wherein the calculating the landing distance step includes
    calculating an extra runway distance from the threshold,
    determining a required landing distance from certified landing distance data, and
    adding the extra runway distance and the required landing distance.

12. The method of claim 9, further comprising determining the approach angle of the aircraft, and wherein the calculating the energy height step includes calculating the energy height based additionally on the approach angle.

13. The method of claim 9, wherein the warning is a first warning if the landing distance extends into the safety margin, and the warning is a second warning if the landing distance exceeds the runway length.

14. The method of claim 9, further comprising adjusting the landing distance based on an additive.

15. The method of claim 14, wherein the additive includes at least one of a wind condition and a runway condition.

16. A system for monitoring an energy height of an aircraft during landing, comprising:
- a database including landing distance data;
- a processing unit configured to receive the landing distance data from the database and to calculate a landing distance of the aircraft based on a velocity and a height of the aircraft; and
- a visual display coupled to the processing unit, the processing unit further configured to calculate an energy height of the aircraft based on the velocity and height and to provide display signals representing the energy height for display on the visual display, the visual display displaying an energy height monitor based on the energy height, the energy height monitor including an energy portion and an outline portion, the energy height monitor indicating at least one of a safe situation, an advisory situation, and an alert situation, the safe situation indicating that the aircraft will land safely within a length of the runway, the advisory situation indicating that the aircraft will land within a margin portion of the runway, and the alert situation indicating that the aircraft will overrun the runway, wherein the energy portion displayed on the visual display during the safe situation and the advisory situation includes a landing portion and a safety portion.

* * * * *